(12) United States Patent
Campbell et al.

(10) Patent No.: US 12,498,517 B2
(45) Date of Patent: Dec. 16, 2025

(54) TERMINATED HOLLOW-CORE FIBER WITH ENDCAP

(71) Applicant: Optoskand AB, Mölndal (SE)

(72) Inventors: Stuart Campbell, Lindome (SE);
Rasmus Kihlberg, Gothenburg (SE);
Mats Blomqvist, Sävedalen (SE)

(73) Assignee: Optoskand AB, Mölndal (SE)

( * ) Notice: Subject to any disclaimer, the term of this patent is extended or adjusted under 35 U.S.C. 154(b) by 0 days.

(21) Appl. No.: 18/770,197

(22) Filed: Jul. 11, 2024

(65) Prior Publication Data

US 2024/0361517 A1 Oct. 31, 2024

Related U.S. Application Data

(63) Continuation of application No. 17/551,117, filed on Dec. 14, 2021, now Pat. No. 12,066,655.

(51) Int. Cl.
*G02B 6/02* (2006.01)
*G02B 6/255* (2006.01)

(52) U.S. Cl.
CPC ......... *G02B 6/02328* (2013.01); *G02B 6/255* (2013.01)

(58) Field of Classification Search
CPC ........................... G02B 6/02328; G02B 6/255
USPC ...................................................... 385/125
See application file for complete search history.

(56) References Cited

U.S. PATENT DOCUMENTS

| | | |
|---|---|---|
| 7,379,648 B1 | 5/2008 | Brooks et al. |
| 11,002,919 B2 | 5/2021 | Alkeskjold et al. |
| 2004/0071423 A1 | 4/2004 | Libori et al. |
| 2012/0307251 A1 | 12/2012 | Sanders et al. |
| 2013/0070252 A1 | 3/2013 | Feth |
| 2019/0113679 A1 | 4/2019 | Schwarz |
| 2020/0310039 A1 | 10/2020 | Alkeskjold et al. |
| 2021/0124112 A1 | 4/2021 | Uebel et al. |
| 2021/0396931 A1 | 12/2021 | Harker et al. |
| 2023/0036091 A1 | 2/2023 | Lugo et al. |

OTHER PUBLICATIONS

International Search Report and Written Opinion received for International Patent Application No. PCT/EP2022/081840 mailed on Feb. 15, 2023, 15 pages.

*Primary Examiner* — Jerry M Blevins
(74) *Attorney, Agent, or Firm* — Morrison & Foerster LLP

(57) ABSTRACT

A terminated hollow-core optical fiber includes a capillary, a hollow-core optical fiber including a structured cladding, and an endcap. A first end of the hollow-core optical fiber terminates inside the capillary a non-zero distance away from a first end face of the capillary. The hollow-core optical fiber is adhered to the capillary at a second end face of the capillary where the hollow-core optical fiber extends out of the capillary. The endcap is fused to the first end face of the capillary. The endcap has a larger diameter than the first end of the hollow-core optical fiber. This termination scheme does not require fusing the hollow-core fiber itself to the endcap or any other part. Therefore, this termination scheme is applicable to hollow-core fibers with a structured cladding that cannot tolerate the temperatures associated with fusing the hollow-core fiber to another part.

13 Claims, 5 Drawing Sheets

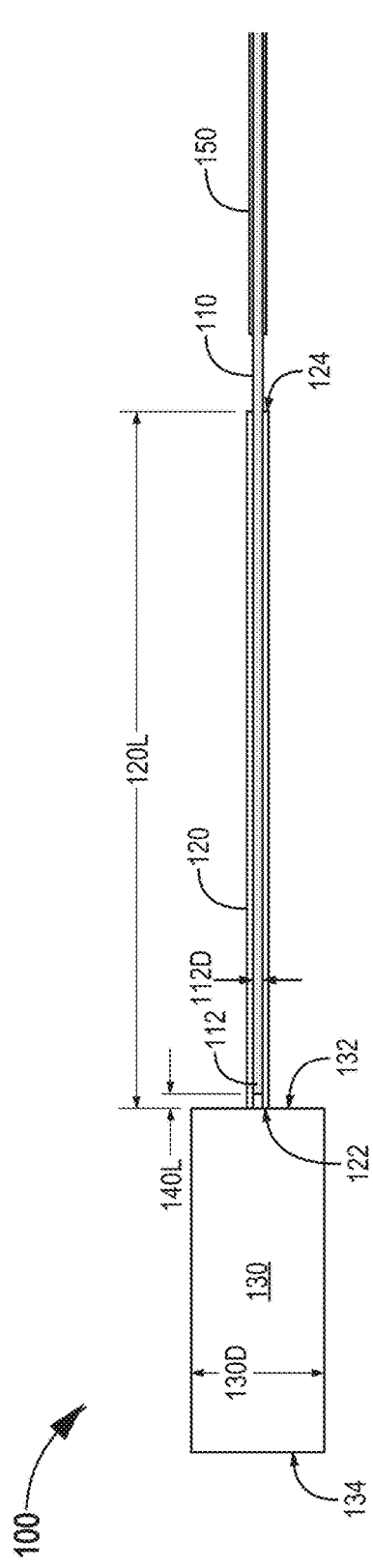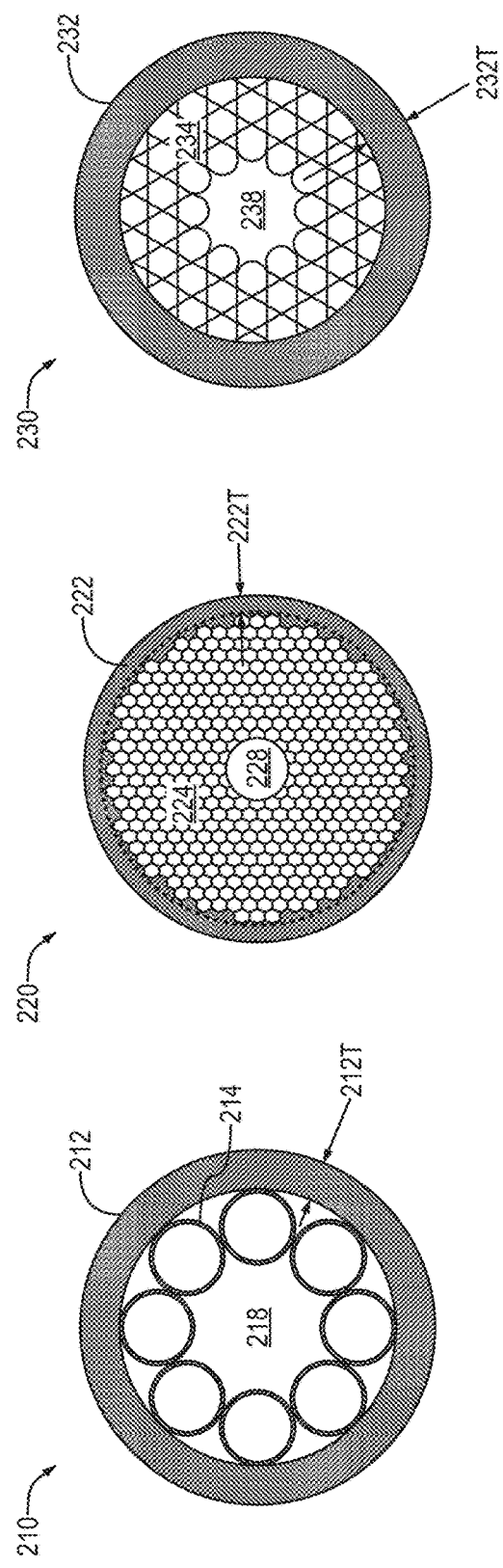

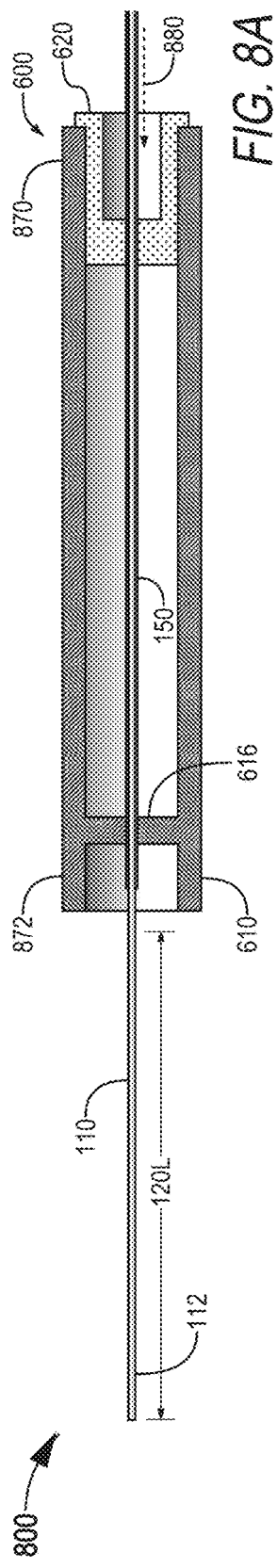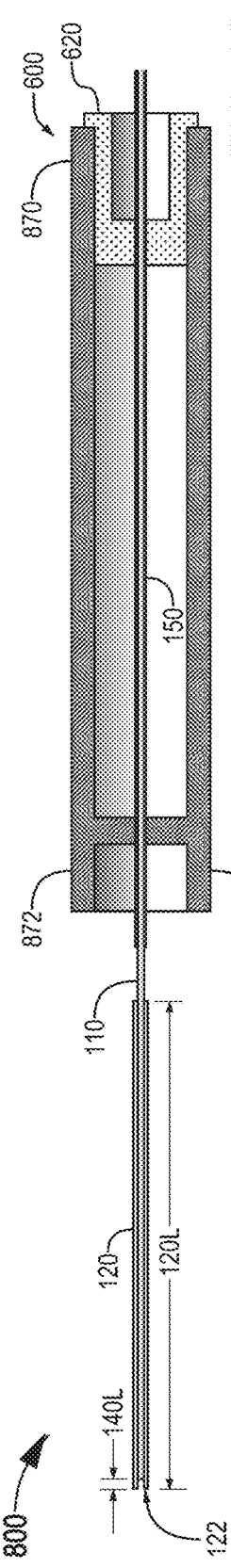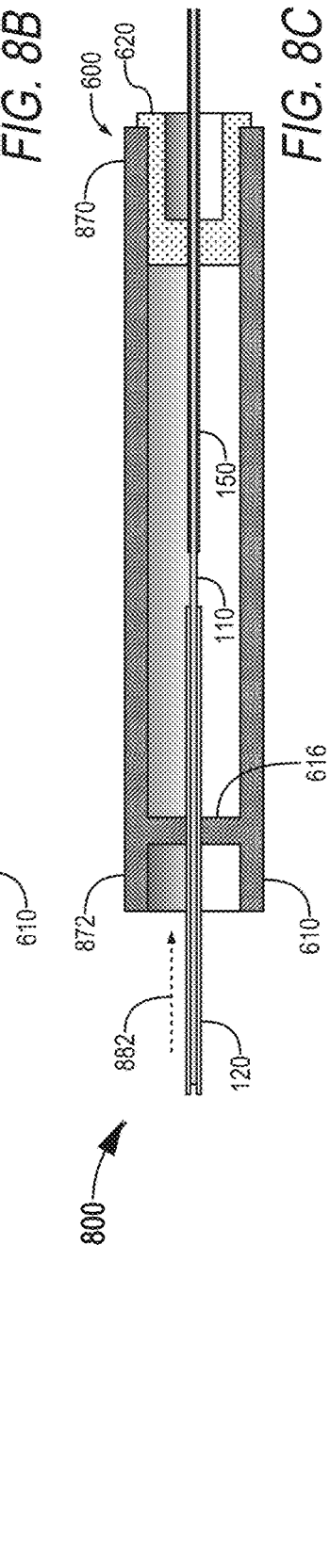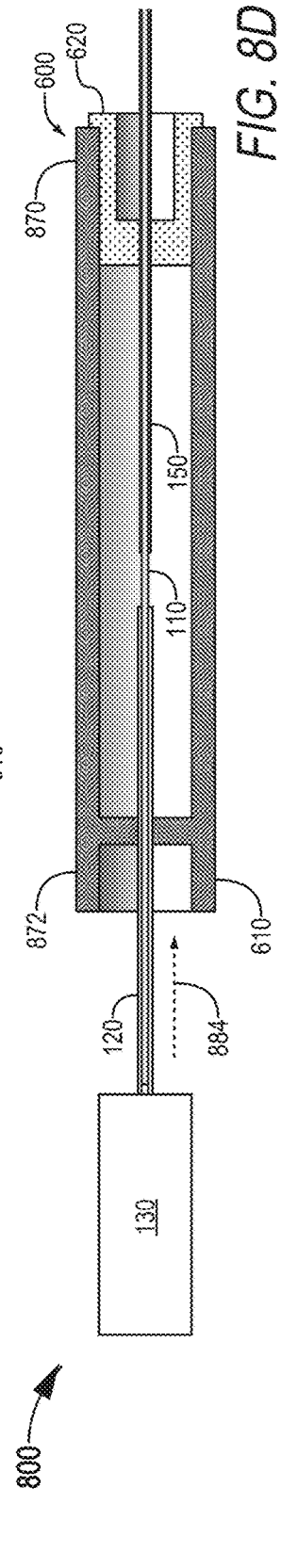

TERMINATED HOLLOW-CORE FIBER WITH ENDCAP

CROSS-REFERENCE TO RELATED APPLICATION

This application is a continuation of U.S. application Ser. No. 17/551,117, filed Dec. 14, 2021, the entire contents of which is incorporated herein by reference.

FIELD OF THE DISCLOSURE

The present invention relates to the termination of optical fibers. The present invention relates in particular to termination of hollow-core optical fibers with endcaps for transmission of high optical power.

BACKGROUND OF THE DISCLOSURE

An optical fiber is made of an optically transmissive material, usually a glass, that guides light from one end of the fiber to the other. A traditional optical fiber has a solid core with a higher refractive index than a surrounding cladding material. Total internal reflection at the interface between the core and the cladding material causes light to be guided in the core.

Optical fibers confine the guided light to a small cross-sectional area. The light-guiding core in many optical single-mode fibers has a diameter of ten micrometers (μm) or less. Thus, when an optical fiber is used to transmit high-power laser light, the laser light intensity in the core can be quite high. This can render the optical fiber susceptible to light-induced damage, especially at the ends of the optical fiber where surface contaminants can act as light absorbers that thermally damage the end of the optical fiber. Such damage is often prevented by protective termination of the optical fiber, wherein the end of the optical fiber is fused to a so-called fiber "endcap". The endcap is a solid piece of glass with a much larger diameter than the core of the optical fiber.

Laser light emerging from an optical fiber is highly divergent due to diffraction and the small diameter of the core thereof. Unlike the core, the endcap does not confine the laser beam to a small cross-sectional area. The diameter of the laser beam at the distal surface of the endcap facing away from the optical fiber is therefore usually at least an order of magnitude greater than at the end of the optical fiber itself. The issue of potential interaction between laser light and surface contaminants is displaced to the distal endcap surface where the laser light intensity is smaller and, consequently, light absorption by surface contaminants on the distal surface of the endcap is unlikely to damage the endcap. Additionally, due to the larger diameter of the laser beam at the distal surface of the endcap, distortion of the mode properties of the laser beam by surface contaminants is usually reduced.

Traditional optical fibers with solid cores have certain limitations. Inevitably, the solid core material absorbs and/or scatters some of the light propagating in the optical fiber, resulting in a loss that limits the distance over which a signal can be transmitted. In telecommunication, where light signals are transmitted over long distances, this loss must be compensated for with optical amplifiers. The light-induced damage threshold of the solid core material also imposes an upper limit on the optical power transmittable by the optical fiber. Therefore, traditional optical fibers with solid cores are generally less suitable for transmission of laser light above a certain power. In applications with spectrally broad laser beams, chromatic dispersion in the core temporally broadens the laser beam. In applications with high-peak-power laser pulses, nonlinear processes can cause optical loss or damage the optical fiber.

A hollow-core optical fiber, on the other hand, guides light in a hollow core rather than a solid core. The light propagates in air, in an optically-inert gas, or in a vacuum. Hollow core fibers therefore have significantly reduced absorption/scattering losses, chromatic dispersion, and optical nonlinearities compared to traditional solid-core fibers. Hollow-core fibers are also capable of transmitting high-power laser light that exceeds the light-induced damage threshold of solid fiber cores. The notion of a hollow-core fiber was conceived of more than fifty years ago as a low-loss alternative to traditional solid-core optical fibers. The first practical implementations were, however, not realized until the 1990s. These first hollow-core fibers relied on the photonic bandgap effect to guide light in a hollow core surrounded by a microstructured photonic-bandgap cladding having many smaller hollow channels arranged in a honeycomb-like pattern.

More recently, simpler designs have been developed with the light-guiding based on antiresonance, that is, destructive optical interference of the component of the light that would otherwise propagate radially away from the optical axis defined by the center of the core. Examples of such simpler designs include Kagome fibers, revolver fibers, and nested-antiresonant-nodeless (NANF) fibers. In each of these designs, a hollow core is surrounded by a structured cladding. The relatively thin-walled structured cladding is supported by a thicker, cylindrical outer wall. The structured cladding has several hollow channels spanning the length of the optical fiber. The radial component of light undergoes partial reflections at the surfaces of the walls of the structured cladding, and these walls are configured such the partial reflections interfere constructively in a manner similar to a Fabry-Perot interferometer. As a result, the structured cladding guides light at the design wavelength to propagate longitudinally along the hollow core instead of transversely outward through the cladding. The revolver fiber is particularly simple. Its cross-sectional shape consists of (a) a larger hollow ring and (b) a set of smaller hollow rings, typically six or eight, arranged along the interior wall of the larger ring and surrounding a void at the center of the larger ring.

SUMMARY OF THE DISCLOSURE

The performance and ease-of-use of hollow-core fibers would benefit from termination with an endcap. Contamination and damage of the ends of a hollow-core fiber presents issues similar to those afflicting traditional solid-core optical fibers. Additionally, if the hollow-core fiber-end is unprotected, moisture from the ambient environment tends to diffuse into the channels of the structured cladding, degrading the light-guiding properties of this structure and even degrading the structure itself.

We have realized that the conventional process of splicing an endcap to the end of an optical fiber is unsuitable for many hollow-core fibers having a structured cladding. Splicing is commonly done by thermally fusing the interface between the optical fiber and the endcap. If the interface between the endcap and a hollow-core fiber with a structured cladding is heated uniformly, the heat required to fuse the hollow-core fiber to the endcap tends to melt the thin walls of the structured cladding.

Disclosed herein is a hollow-core-fiber termination solution that connects an endcap to a hollow-core fiber with no need for fusing the hollow-core fiber itself to any other part. This termination therefore extends the benefits of an endcap to hollow-core fibers having a structured cladding.

In the present approach, an endcap is connected to a hollow-core fiber only indirectly such that the structured cladding of the hollow-core fiber is not exposed to excessive heat. The hollow-core fiber is inserted into a capillary, with the end of the optical fiber terminating inside the capillary a short distance before an end face of the capillary. The endcap is fused to this end face of the capillary. During the fusing process, the capillary holds the hollow-core fiber, while providing the thermal isolation required to prevent excessive heating of the structured cladding of the hollow-core fiber. To secure the hollow-core fiber in the capillary, the hollow-core fiber is adhered to the opposite end of the capillary where the hollow-core fiber extends out of the capillary in the direction away from the endcap. This adhesive bond may cooperate with the fused bond between the capillary and the endcap to seal off the end of the hollow core fiber from the outside environment.

In one aspect, a terminated hollow-core optical fiber includes a capillary, a hollow-core optical fiber having a structured cladding, and an endcap. The hollow-core optical fiber has a first end that terminates inside the capillary a non-zero distance away from a first end face of the capillary. The hollow-core optical fiber is adhered to the capillary at a second end face of the capillary where the hollow-core optical fiber extends out of the capillary. The endcap is fused to the first end face of the capillary. The endcap has a larger diameter than the first end of the hollow-core optical fiber.

In another aspect, a method for terminating a hollow-core optical fiber includes a step of positioning a first end of a hollow-core optical fiber, having a structured cladding, in a capillary such that the first end of the hollow-core optical fiber terminates inside the capillary a non-zero distance away from a first end face of the capillary. The method also includes, after the positioning step, a step of adhering the hollow-core optical fiber to the capillary at a second end face of the capillary where the hollow-core optical fiber extends out of the capillary. In addition, the method includes a step of laser welding an endcap to the first end face of the capillary. The endcap has a larger diameter than the first end of the hollow-core optical fiber.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIG. 1 illustrates a hollow-core fiber terminated with an endcap via a capillary and with no need for fusing the hollow-core fiber to either one of the endcap and the capillary, according to an embodiment.

FIG. 2 illustrates examples of hollow-core fibers that may be terminated according to the scheme of FIG. 1.

FIGS. 8A-D illustrate certain steps of a method for assembling the connectorized hollow-core fiber of FIG. 7, according to an embodiment.

DETAILED DESCRIPTION OF THE DISCLOSURE

Figure 3:
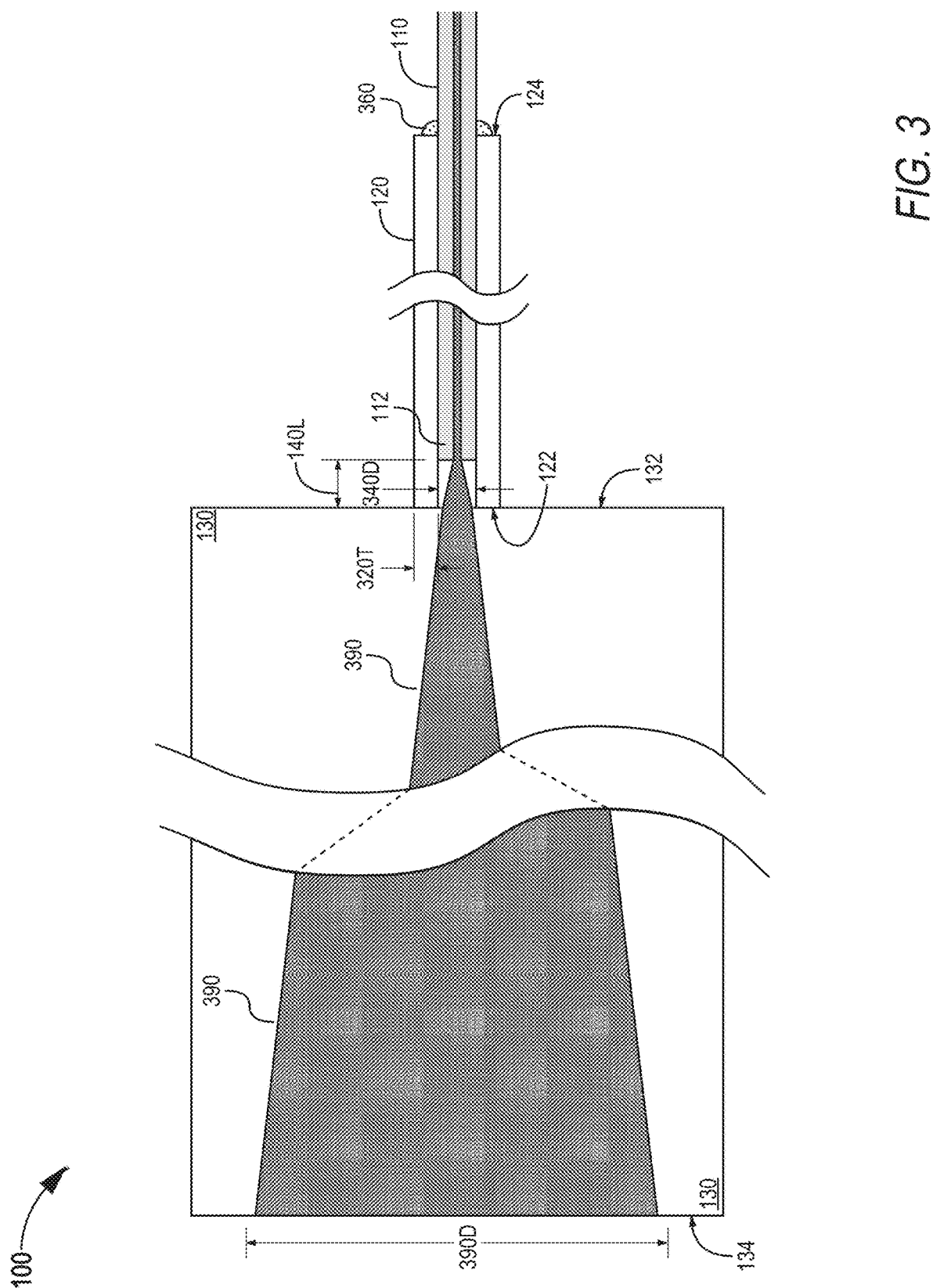
FIG. 3 shows the terminated hollow-core fiber of FIG. 1 in further detail and also illustrates light propagation therethrough.

Referring now to the drawings, wherein like components are designated by like numerals, FIG. 1 illustrates one terminated hollow-core fiber 100. Terminated hollow-core fiber 100 includes a hollow-core fiber 110, a capillary 120, and an endcap 130. Hollow-core fiber 110 is connected to endcap 130 via capillary 120 and with no need for fusing hollow-core fiber 110 to either one of endcap 130 and capillary 120. Capillary 120 and endcap 130 may be made of glass.

An end 112 of hollow-core fiber 110 is positioned inside capillary 120. Fiber end 112 terminates inside capillary 120, a non-zero distance 140L away from an end face 122 of capillary 120. End face 122 and endcap 130 are fused together, for example by laser welding. By virtue of non-zero distance 140L, endcap 130 is not fused directly to hollow-core fiber 110. Capillary 120 facilitates termination of hollow-core fiber 110 with endcap 130 without exposing fiber end 112 to potentially damaging levels of heat.

FIG. 2 illustrates examples of hollow-core fibers 110 that may be terminated according to the scheme of terminated hollow-core fiber 100: a revolver fiber 210, a photonic crystal fiber 220, and a Kagome fiber 230. FIG. 2 shows a cross-sectional view of each of fibers 210, 220, and 230. The applicability of the termination scheme of terminated hollow-core fiber 100 is not limited to the fiber types shown in FIG. 2. For example, this termination scheme may be applied to a NANF fiber as well.

Revolver fiber 210 includes a solid outer wall 212 and a plurality of tubes 214 arranged on the interior surface of outer wall 212. Tubes 214 form an antiresonant structured cladding that surrounds a hollow core 218. Outer wall 212 may have a different shape than depicted in FIG. 2. However, most commonly, outer wall 212 has an approximately circular cross section, such that outer wall 212 has an approximately uniform thickness 212T.

Photonic crystal fiber 220 has a microstructured cladding 224 with a large number of hexagonal channels arranged in a honeycomb pattern. Microstructured cladding 224 surrounds a hollow core 228. The material forming microstructured cladding 224 also forms a continuous outer wall 222 that surrounds microstructured cladding 224. The exterior surface of outer wall 222 usually has a circular cross section, and outer wall 222 may be characterized by a minimum thickness 222T with some segments of outer wall 222 being somewhat thicker than minimum thickness 222T due to the honeycomb pattern of microstructured cladding 224.

Kagome fiber 230 includes a cladding 234 consisting of thin walls arranged in a trihexagonal tiling pattern known from Japanese Kagome baskets. Cladding 234 is supported by a solid outer wall 232 and surrounds a hollow core 238. The interior and exterior surfaces of outer wall 232 usually have approximately circular cross sections, such that outer wall 232 has an approximately uniform thickness 232T.

Each of revolver fiber 210, photonic crystal fiber 220, and Kagome fiber 230 has a hollow core surrounded by a structured cladding, and the structured cladding is surrounded and supported by a solid outer wall. Many other types of hollow-core fibers have this same basic design, including hexagonal hollow-core fibers, anti-resonant fibers with parachute-shaped cells, nested-antiresonant-nodeless fibers, and conjoined-tube anti-resonant fibers. Furthermore, many of these types of fibers come in different versions. For example, a revolver fiber may be configured with adjacent tubes 214 touching each other, as shown in FIG. 2, or with space between each pair of adjacent tubes. Additionally, the thickness of the outer wall may vary significantly between different versions of each of the hollow-core fiber types mentioned above.

Referring again to FIG. 1, hollow-core fiber 110 includes a structured cladding that surrounds a hollow core. Hollow-core fiber 110 also includes a solid outer wall that surrounds the structured cladding. The termination scheme of terminated hollow-core fiber 100 is compatible with hollow-core fibers where the solid outer wall is essentially the outermost wall(s) of the structured cladding rather than a wall that is substantially thicker than the walls forming the structured cladding. However, the insertion of hollow-core fiber 110 into capillary 120 may be easier if the solid outer wall of hollow-core fiber 110 is structurally strong.

Capillary 120 forms a thermal bridge between hollow-core fiber 110 and the interface between capillary 120 and endcap 130. However, distance 140L and the dimensions of capillary 120 may be chosen such that the thermal impedance of capillary 120 is sufficient to keep the temperature of the structured cladding of hollow-core fiber 110 at a safe level during fusing of endcap 130 with end face 122 of capillary 120. The thickness of the solid outer wall of hollow-core fiber 110, e.g., thickness 212T, 222T, or 232T, may also provide thermal isolation. However, by virtue of the thermal impedance of capillary 120, the solid outer wall of hollow-core fiber 110 is not relied upon for thermal isolation. In some embodiments of terminated hollow-core fiber 100, the minimum thickness of the solid outer wall of hollow-core fiber 110 is less than 30 µm, for example in the range between 10 and 30 µm or between 10 and 20 µm.

Fusing of end face 122 to endcap 130 partly seals off fiber end 112 from the environment. In one embodiment, endcap 130 is fused to end face 122 along a closed path that completely surrounds the interior hollow of capillary 120, so as to seal this interface.

To secure hollow-core fiber 110 in capillary 120, hollow-core fiber 110 is adhered to capillary 120 at the end face 124 of capillary 120 where hollow-core fiber 110 extends out of capillary in the direction away from endcap 130. This adhesive bond may also serve to seal off fiber end 112 from the environment. In conjunction with a sealing bond between endcap 130 and end face 122 of capillary 120, endcap 130 and capillary 120 thereby protect fiber end 112 from contaminants and moisture that otherwise may damage hollow-core fiber 110 or degrade its performance.

In an alternative approach, capillary 120 is laser welded to hollow-core fiber 110 at end face 124 of capillary 120. This alternative approach advantageously eliminates the need for an adhesive at end face 124 and therefore also eliminates any associated risk of outgassing from such an adhesive causing contamination of surface 132 or the end of hollow-core fiber 110 facing surface 132. On the other hand, as discussed above, laser welding of capillary 120 to hollow-core fiber 110 may not be possible without compromising the structured cladding of hollow-core fiber 110.

The diameter 130D of endcap 130 exceeds the diameter 112D of fiber end 112, such that light entering or exiting hollow-core fiber 110 via fiber end 112 has a lower fluence in endcap 130 than in hollow-core fiber 110. Diameter 130D may be one or several millimeters (mm). The beam diameter at the distal surface 134 of endcap 130, facing away from fiber end 112, is therefore greater than at the termination of fiber end 112. Thus, even if contaminants are present on distal surface 134, these contaminants are less likely to present an issue. In certain embodiments, surface 134 has an antireflective (AR) coating to eliminate or reduce Fresnel losses at this surface.

FIG. 3 shows terminated hollow-core fiber 100 in further detail and also illustrates light propagation therethrough. Light (e.g., laser light) propagating in hollow-core fiber 110 in the direction toward fiber end 112 exits fiber end 112 inside capillary 120 and forms a light beam 390 (e.g., a laser beam). Over distance 140L from fiber end 112 to the proximal surface 132 of endcap 130, beam 390 expands radially due to diffraction. Inside endcap 130, beam 390 continues to expand radially until reaching a maximum diameter 390D at distal surface 134 of endcap 130.

Preferably, distance 140L and the inner diameter 340D of capillary 120 along distance 140L are chosen such that beam 390, expanding in the direction from hollow-core fiber 110 to endcap 130, is not incident on capillary 120. For example, distance 140L and inner diameter 340D may be such that the $1/e^2$ diameter of beam 390 is smaller than inner diameter 340D. The appropriate choices for distance 140L and inner diameter 340D depend on the properties of hollow-core fiber 110, specifically, the mode-field diameter therein.

In one embodiment, hollow-core fiber 110 is a single-mode fiber characterized by a mode-field diameter MFD and configured to guide light with a wavelength A. In this embodiment, non-zero distance 140 may obey the relationship $$L < \frac{\pi}{\lambda}\left(\frac{MFD}{2}\right)^2 \sqrt{\frac{D}{MFD}},$$

wherein L represents distance 140L and D represents inner diameter 340D of capillary 120. When distance 140L obeys this relationship, the $1/e^2$ diameter of beam 390 remains smaller than inner diameter 340D of capillary 120 along the entire distance 140L between fiber end 112 and endcap 130. In another embodiment, hollow-core fiber 110 is a multimode fiber characterized by a numerical aperture NA. To prevent beam 390 from reaching the walls of capillary 120, non-zero distance 140 may be less than D/(2NA) in this embodiment.

When coupling light into fiber end 112 of hollow-core fiber 110, beam 390 is converging when incident on endcap 130 at distal surface 134. For optimal coupling into hollow-core fiber 110, the transverse intensity distribution of a beam 390 propagating in the direction from distal surface 134 to fiber end 112 is similar or identical to the transverse intensity distribution of a beam 390 propagating in the direction from fiber end 112 to distal surface 134.

Capillary 120 may be cylindrical with an inner cylindrical surface and an outer cylindrical surface. The wall thickness 320T of capillary 120 may cooperate with distance 140L to prevent overheating end 112 of hollow-core fiber 110 when capillary 120 and endcap 130 are fused together.

The need for thermal isolation between hollow-core fiber 110 and end face 122 of capillary 120 puts a lower limit on distance 140L. On the other hand, an upper limit on distance 140L may be imposed by a requirement to prevent beam 390 from illuminating capillary 120. In one design approach, the selection of parameters, such as distance 140L, inner diameter 340D, and wall thickness 320T, is driven by the properties of hollow-core fiber 110. To achieve a good fit between hollow-core fiber 110 and capillary 120, it is preferred that inner diameter 340D of capillary 120 just slightly exceeds the outer diameter 112D of end 112 of hollow-core fiber 110, for example by a few micrometers or a few tens of micrometers. Therefore, in this approach, diameter 112D determines inner diameter 340D of capillary 120. The mode properties of hollow-core fiber 110, e.g., its mode-field diameter or numerical aperture, determine the divergence of a beam 390 emerging from fiber end 112. This divergence and inner diameter 340D together define an upper limit for distance 140L. In one example, outer diameter 112D is in the range between 60 and 240 μm, inner diameter 340D is in the range between 65 and 275 μm, distance 140L is at least 50 μm, for example between 50 and 200 μm, and wall thickness 320T is at least 50 μm, for example between 50 and 100 μm.

As mentioned above in reference to FIG. 1, hollow-core fiber 110 is adhered to capillary 120 at the end of capillary 120 where hollow-core fiber 110 extends out of capillary 120. This is illustrated in FIG. 3 where a bead of adhesive 360 secures hollow-core fiber 110 to end face 124 of capillary 120. Adhesive 360 may extend all the way around the circumference of hollow-core fiber 110 to ensure a complete seal. Adhesive 360 may be located almost exclusively outside capillary 120, as shown in FIG. 3. Alternatively, some or all of adhesive 360 may be allowed to penetrate into capillary 120 along the interface between hollow-core fiber 110 and the interior wall of capillary 120. To prevent or at least reduce contamination of fiber end 112 and surface 132 of endcap 130 caused by outgassing of adhesive 360, the length 120L of capillary 120 may be at least 10 mm, for example in the range between 10 and 150 mm.

Outside capillary 120, hollow-core fiber 110 may have a jacket 150 disposed on the outer wall of hollow-core fiber 110 (e.g., outer wall 212, 222, or 232, or another similar outer wall). Jacket 150 may be made of a polymer with a lower refractive index than the outer wall of hollow-core fiber 110 to minimize outcoupling of light that has leaked into the outer wall or a higher refractive index to prevent leaked light from being guided within the outer wall. However, polymers are known to outgas and thereby contaminate optical surfaces. In embodiments where hollow-core fiber 110 includes jacket 150, jacket 150 is absent from the portion of hollow-core fiber 110 positioned inside capillary 120. For example, jacket 150 may have been stripped off this portion of hollow-core fiber 110 before insertion into capillary 120 to avoid potentially contaminating surface 132 and fiber end 112. Additionally, if jacket 150 was present on the portion of hollow-core fiber 110 located inside capillary 120, the pliability of a typical jacket material might compromise the accuracy and stability of the position of hollow-core fiber 110 relative to capillary 120.

Figure 4:
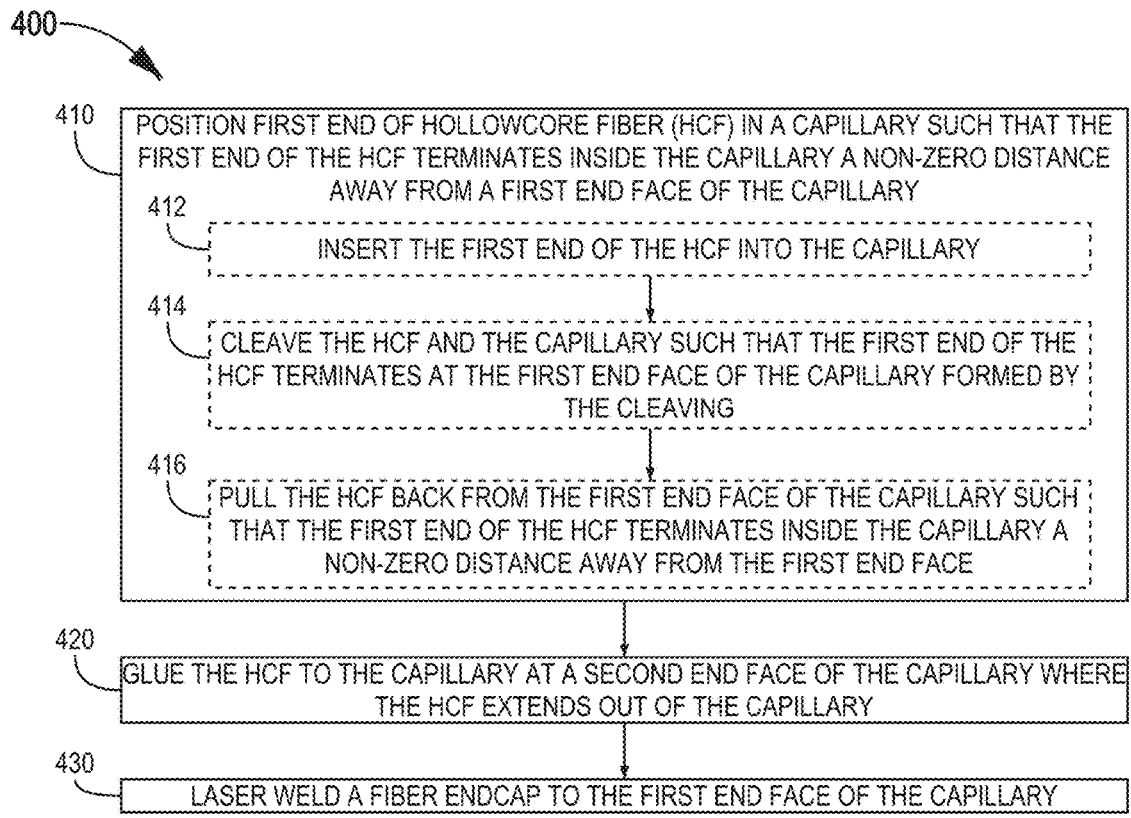
FIG. 4 is a flowchart for a method for terminating a hollow-core fiber with an endcap, with no need for fusing the hollow-core fiber to another part, according to an embodiment.

FIG. 4 is a flowchart for one method 400 for terminating a hollow-core fiber with an endcap, with no need for fusing the hollow-core fiber to another part. Method 400 may be used to terminated hollow-core fiber 110 so as to produce terminated hollow-core fiber 100. Method 400 may be performed with robotic equipment and/or using manual operations. In the following, method 400 is discussed in the context of hollow-core fiber 110 and terminated hollow-core fiber 100.

Method 400 includes steps 410, 420, and 430. Step 410 positions end 112 of hollow-core fiber 110 in capillary 120 such that fiber end 112 terminates inside capillary 120 at a distance 140L away from end face 122 of capillary 120. This arrangement is depicted in FIG. 1. Step 420 adheres hollow-core fiber 110 to capillary 120 at end face 124 of capillary 120, as discussed above in reference to FIG. 3 and adhesive 360. Step 430 laser welds endcap 130 to end face 122 of capillary 120, resulting in the configuration depicted in FIG. 1.

Steps 410, 420, and 430 may be performed in the order listed in FIG. 4. Alternatively, the order of steps 420 and 430 may be reversed, although it may be more practical to perform the laser welding in step 430 after having performed step 420 to secure hollow-core fiber 110 in capillary 120 in the desired position. It is also possible to perform step 430 before steps 410 and 420. However, performing step 410 prior to step 430 is required to utilize a particularly practical embodiment of step 410 discussed below in reference to FIGS. 5A-5D.

FIGS. 5A-D depict one embodiment of step 410 of method 400 to position hollow-core fiber 110 in capillary 120. This embodiment of step 410 includes steps 412, 414, and 416 indicated in the flowchart of FIG. 4 and performed in the order listed.

Figure 5A:
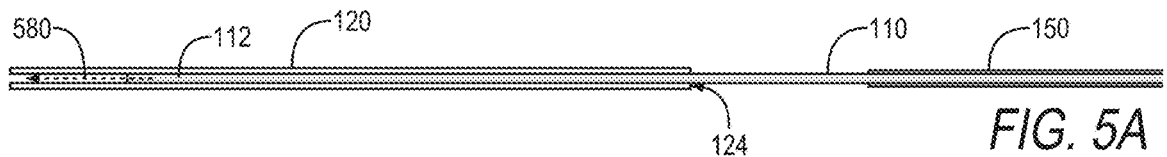
FIGS. 5A-D illustrate a method for positioning a hollow-core fiber in a capillary, according to an embodiment.
Figure 5B:
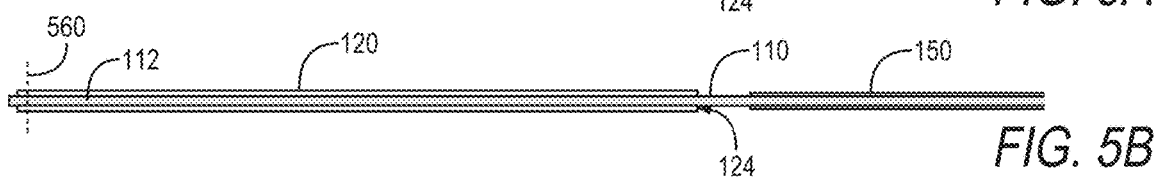

Step 412 inserts end 112 of hollow-core fiber 110 into capillary 120 from the end of capillary 120 having end face 124, as shown in FIG. 5A and indicated therein by arrow 580. Step 412 may position hollow-core fiber 110 such that fiber end 112 terminates inside capillary 120, outside capillary 120 or exactly at the end of capillary 120. It is not necessary to perform step 410 with great accuracy. FIG. 5B shows one example configuration after completion of step 412, wherein hollow-core fiber 110 extends all the way through capillary 120.

Figure 5C:

Step 414 cleaves hollow-core fiber 110 and capillary 120 together, as indicated by cleaving line 560 in FIG. 5B. Step 414 results in (a) the formation of end face 122 of capillary 120 and (b) fiber end 112 terminating at end face 122, as shown in FIG. 5C.

Figure 5D:

FIG. 5D illustrates step 416. Step 416 pulls hollow-core fiber 110 back from end face 122, as indicated by arrow 582, such that fiber end 112 terminates inside capillary 120 distance 140L away from end face 122.

When hollow-core fiber 110 is equipped with jacket 150, step 410 of method 400 is preceded by a step of stripping jacket 150 off the portion of hollow-core fiber 110 that is inside capillary 120 during or after the performance of step 410.

As an alternative to method 400, hollow-core fiber 110 may be cleaved separately from capillary 120. For example, capillary 120 may be cleaved prior to insertion of hollow-core fiber 110 therein. In this case, the process step depicted in FIG. 5B cleaves a portion of fiber end 112 protruding from capillary 120.

Figure 6:
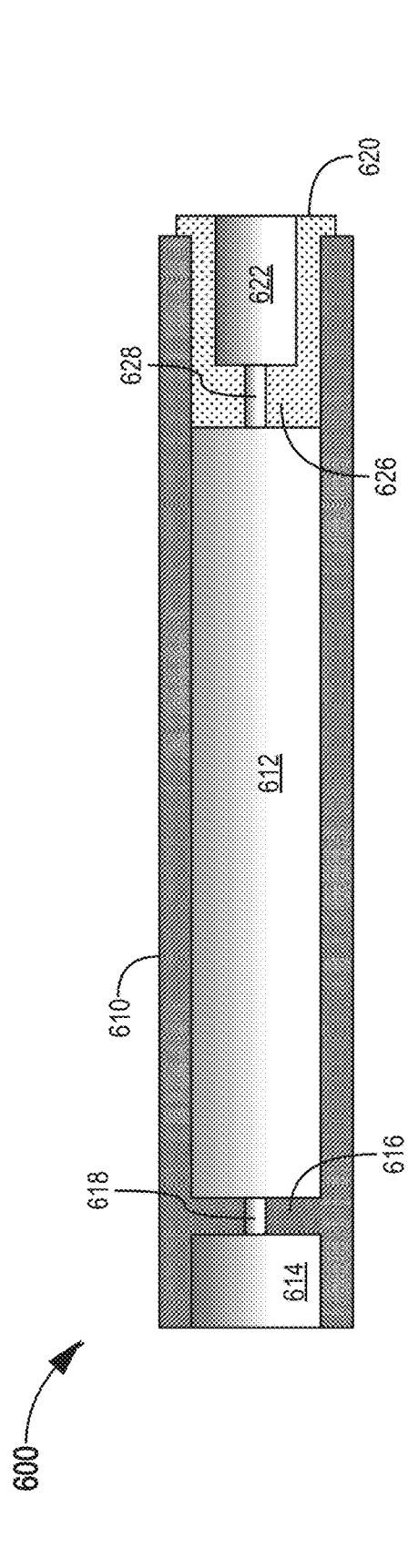
FIG. 6 illustrates a housing for the terminated hollow-core fiber of FIG. 1, according to an embodiment.
Figure 7:
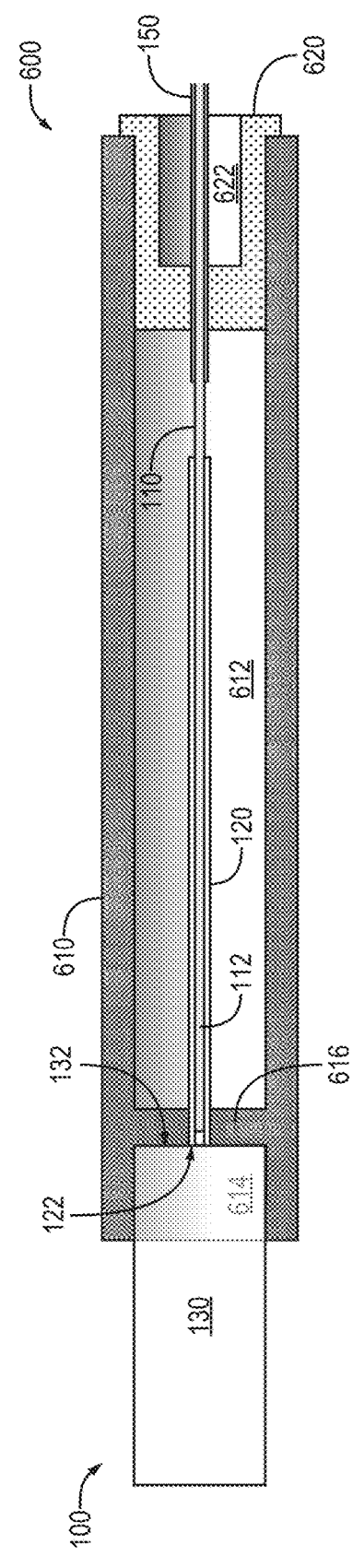
FIG. 7 illustrates a connectorized hollow-core fiber that includes the terminated hollow-core fiber of FIG. 1 and the housing of FIG. 6, according to an embodiment.

FIG. 6 is a full section view of one housing 600 for terminated hollow-core fiber 100. FIG. 7 is a full section view of one connectorized hollow-core fiber 700 that is terminated hollow-core fiber 100 implemented in housing 600. In each of FIGS. 6 and 7, the full section view is taken along a mid-plane extending along a longitudinal axis of housing 600 that, in connectorized hollow-core fiber 700, contains the optical axis of hollow-core fiber 110. Housing 600 may be rotationally symmetric about the optical axis of hollow-core fiber 110.

Housing 600 includes a ferrule 610 and an insert 620. Ferrule 610 has two hollow compartments 612 and 614 separated from each other by a divider 616. A narrower channel 618 passes through divider 616 between compartments 612 and 614. Insert 620 is seated in compartment 612 farthest from divider 616. Insert 620 has (a) a hollow compartment 622 facing away from divider 616, (b) a wall 626 between compartment 622 and the portion of compartment 612 not occupied by insert 620, and (c) a narrower channel 628 passing through wall 626 between compartments 622 and 612.

When terminated hollow-core fiber 100 is implemented in housing 600, as shown in FIG. 7, endcap 130 is seated in compartment 614, capillary 120 extends through channel 618 from endcap 130 into compartment 612, and hollow-core fiber 110 extends from inside capillary 120 through channel 628 and compartment 622 of insert 620. Proximal surface 132 of endcap 130 may be seated on divider 616, as shown in FIG. 7, or endcap 130 may be seated in compartment 614 a non-zero distance away from divider 616. The portion of hollow-core fiber 110 extending through insert 620 may be equipped with jacket 150. Capillary 120 may fit snugly in channel 618, and hollow-core fiber 110 (optionally jacket 150 thereof) may fit snugly in channel 628 of insert 620.

To secure terminated hollow-core fiber 100 in housing 600, an adhesive may be applied to an interface between endcap 130 and ferrule 610. Similarly, an adhesive may be applied to an interface between hollow-core fiber 110 and insert 620. Alternatively, when the portion of hollow-core fiber 110 passing through channel 628 of insert 620 includes jacket 150, hollow-core fiber 110 may be press-fit in channel 628. In either case, housing 600 holds endcap 130 and a section of hollow-core fiber 110 that is outside capillary 120, while capillary 120 is contained by housing 600.

Ferrule 610 and insert 620 may be made of metal. In one example, ferrule 610 is made of copper and insert 620 is made of brass. Housing 600 protects capillary 120 and the interface between capillary 120 and endcap 130. In particular, the mechanical strength of housing 600 serves to prevent capillary 120 from breaking and also serves to prevent breakage of the bond between capillary 120 and endcap 130.

In an alternative embodiment, housing 600 omits insert 620. In this alternative embodiment, wall 626, channel 628, and compartment 622 are instead integrally formed features of ferrule 610. The separate insert 620 in the embodiment of housing 600 shown in FIGS. 6 and 7 serves to simplify the manufacture of housing 600.

FIGS. 8A-D illustrate certain steps of one method 800 for assembling connectorized hollow-core fiber 700. Method 800 is an extension of method 400. First, as illustrated in FIG. 8A, hollow-core fiber 110 is inserted into housing 600 via the end 870 of housing 600 having insert 620. Hollow-core fiber 110 is passed through housing 600 in the direction indicated by arrow 880 until fiber end 112 extends beyond divider 616 by at least the length 120L of capillary 120 (and more, if hollow-core fiber 110 is cleaved separately from capillary 120 after insertion of hollow-core fiber 110 into capillary 120). Preferably, fiber end 112 extends at least length 120L beyond the end 872 of housing 600 that is farthest from insert 620. The insertion step illustrated in FIG. 8A involves passing hollow-core fiber 110 through channel 628 of insert 620 and channel 618 of ferrule 610 (see FIG. 6).

Next, as illustrated in FIG. 8B, capillary 120 is slipped onto fiber end 112 and positioned such that fiber end 112 terminates inside capillary 120, distance 140L away from end face 122 of capillary 120. The FIG. 8B step of assembling hollow-core fiber 110 and capillary 120 is an embodiment of step 410 of method 400 and may include steps 412, 414, and 416. When capillary 120 is positioned relative to fiber end 112 as shown in FIG. 8B, step 420 of method 400 is performed to adhere hollow-core fiber 110 to the end of capillary 120 closest to housing 600.

Once capillary 120 is secured to hollow-core fiber 110 in this manner, hollow-core fiber 110 is partly retracted into housing 600, as illustrated in FIG. 8C and indicated by arrow 882, such that capillary 120 is supported in divider 616. When capillary 120 is supported in this manner, endcap 130 is fused to capillary 120 as shown in FIG. 8D. This fusing step is an embodiment of step 430 of method 400 and is performed by laser welding. After laser welding endcap 130 to capillary 120, hollow-core fiber 110 is retracted further, as indicated by arrow 884 in FIG. 8D, until endcap 130 is seated in end 872 of housing 600. In one embodiment, endcap 130 is seated on divider 616 as shown in FIG. 7. Once endcap 130 is positioned in this manner, an adhesive may be applied to secure endcap 130 and/or hollow-core fiber 110 to housing 600 as discussed above in reference to FIGS. 6 and 7.

In the example of method 800 illustrated in FIGS. 8A-D, hollow-core fiber 110 has a jacket 150, but jacket 150 is absent from the portion of hollow-core fiber 110 that is inserted into capillary 120. Method 800 may start with hollow-core fiber 110 being fully jacketed and then include a step of stripping off a portion of the jacket after inserting hollow-core fiber 110 into housing 600.

The present invention is described above in terms of a preferred embodiment and other embodiments. The invention is not limited, however, to the embodiments described and depicted herein. Rather, the invention is limited only by the claims appended hereto.

What is claimed is:

1. A method for terminating a hollow-core optical fiber, comprising steps of:
   positioning a first end of a hollow-core optical fiber, having a structured cladding, in a bore of a capillary such that the first end of the hollow-core optical fiber terminates inside the capillary a non-zero distance away from a first end face of the capillary, the bore being defined by an inner cylindrical surface of the capillary, the inner cylindrical surface extending from the first end face to a second end face of the capillary, the first and second end facing in mutually-opposite directions;
   after the positioning step, adhering the hollow-core optical fiber to the capillary at the second end face of the capillary where the hollow-core optical fiber extends out of the capillary; and
   laser welding an endcap to the first end face of the capillary, the endcap having a larger diameter than the first end of the hollow-core optical fiber and being directly abutted to the first end face.

2. The method of claim 1, wherein the laser welding step is performed after the positioning step.

3. The method of claim 2, wherein the positioning step includes steps of:
   inserting the first end of the hollow-core optical fiber into the bore of the capillary;
   cleaving the hollow-core optical fiber and capillary together such that the first end of the hollow-core optical fiber terminates at the first end face of the capillary formed by said cleaving; and
   pulling the hollow-core optical fiber back from the first end face of the capillary such that the first end of the hollow-core optical fiber terminates inside the capillary a non-zero distance away from the first end face.

4. The method of claim 1, wherein the laser welding step is performed after the adhering step.

5. The method of claim 1, wherein the laser welding step is performed before the positioning step.

6. The method of claim 1, further comprising a step of stripping a jacket from the first end of the hollow-core fiber before the positioning step.

7. The method of claim 1, further comprising steps of:
prior to the positioning step, inserting the hollow-core optical fiber into a housing, via a first end of the housing, such that the hollow-core optical fiber protrudes from a second end of the housing opposite the first end; and
after the laser welding step, shifting the housing along the hollow-core optical fiber toward the endcap such that the endcap contacts the housing at the second end.

8. The method of claim 7, further comprising sealing the first and second ends of the housing after the shifting step.

9. The method of claim 1, wherein the non-zero distance between the first end of the hollow-core optical fiber and the first end face of the capillary is in the range between 50 and 200 micrometers.

10. The method of claim 9, wherein the inner cylindrical surface has a diameter in the range between 60 and 240 micrometers.

11. The method of claim 1, the first and second end faces of the capillary are at least 10 millimeters apart from each other.

12. The method of claim 1, wherein the capillary is a cylinder with a cylindrical outer surface.

13. The method of claim 1, wherein the hollow-core fiber includes:
a solid outer wall forming a radially outermost surface of the first end of the hollow-core fiber; and
a structured cladding inside the solid outer wall to guide light in a hollow core surrounded by the structured cladding.

* * * * *